Aug. 20, 1946.  H. A. PERKINS  2,406,033
APPARATUS FOR THE MANUFACTURE OF CONVOLUTED RODS
Filed Jan. 19, 1944  5 Sheets-Sheet 4
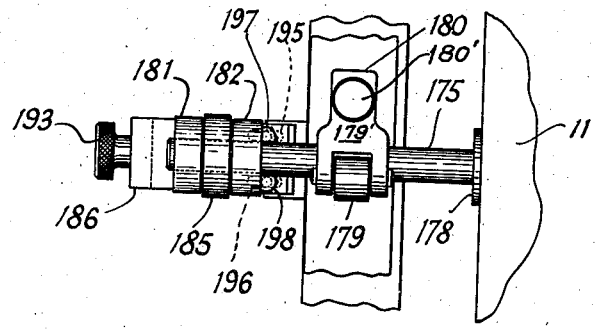
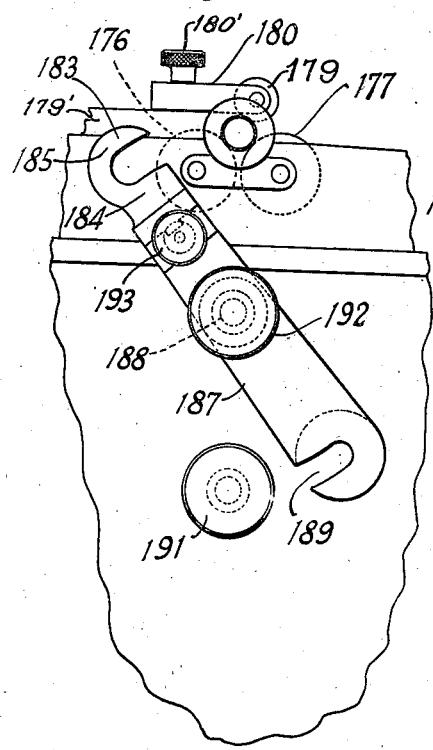
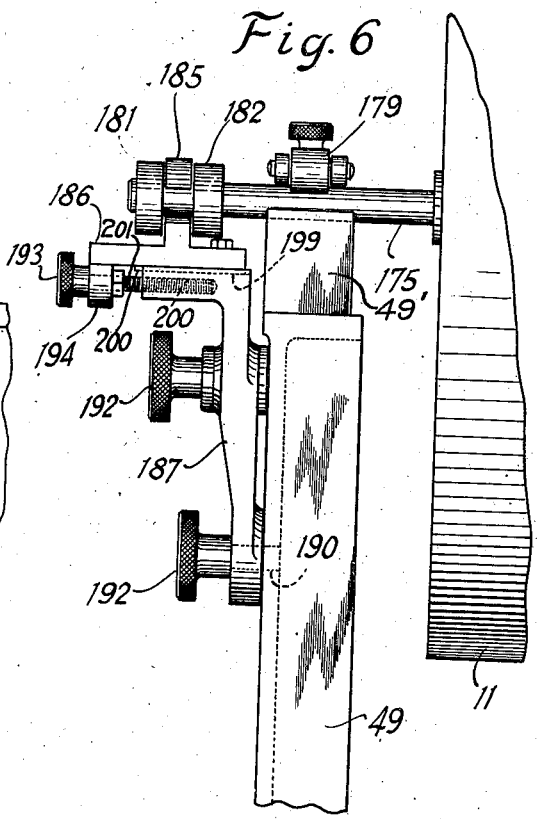
Hiram A. Perkins, Deceased,
INVENTOR.
Stuart L. Perkins &
Madeleine P. Hathaway
Executors
BY
ATTORNEY

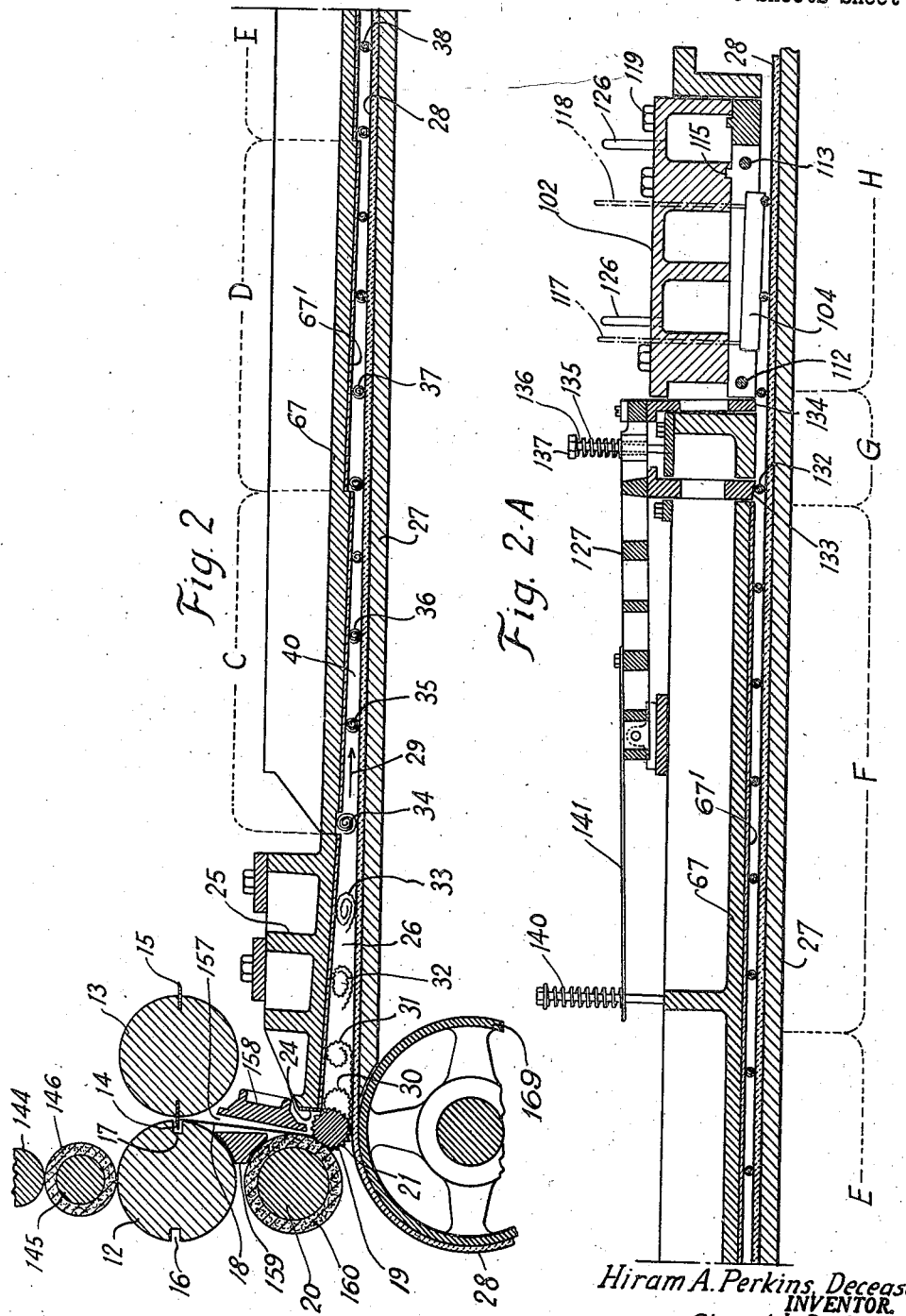

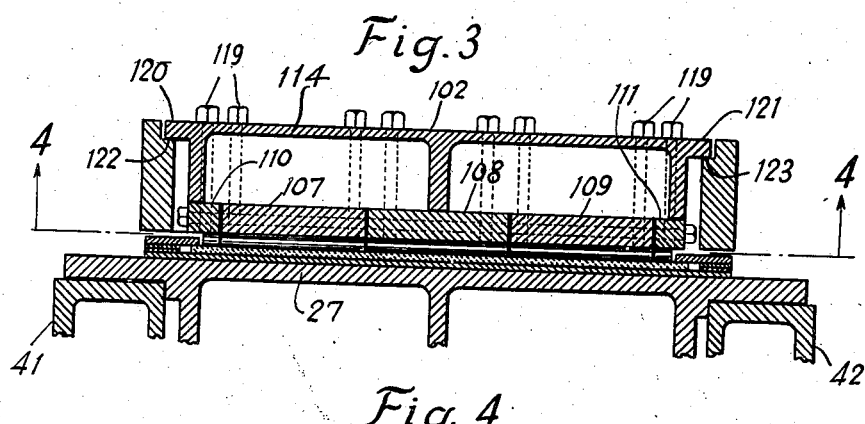
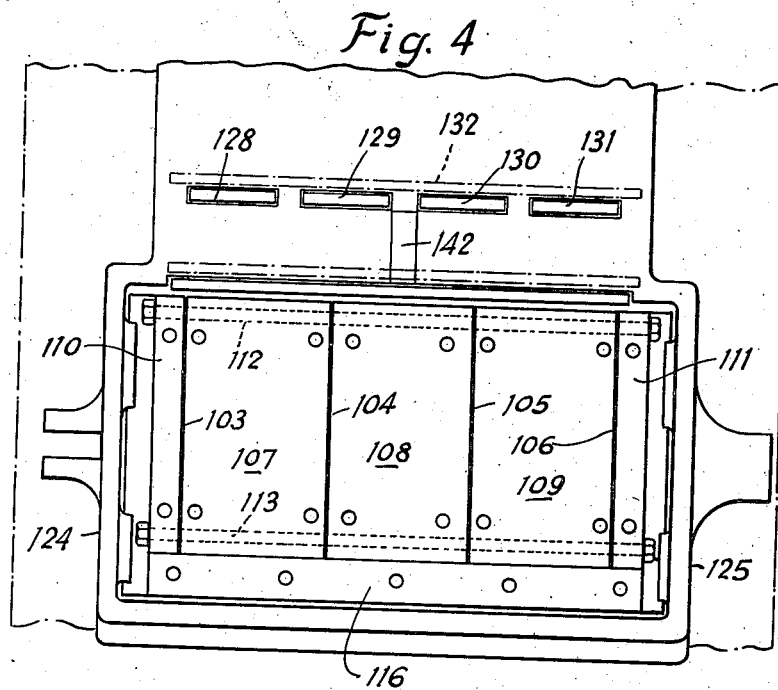

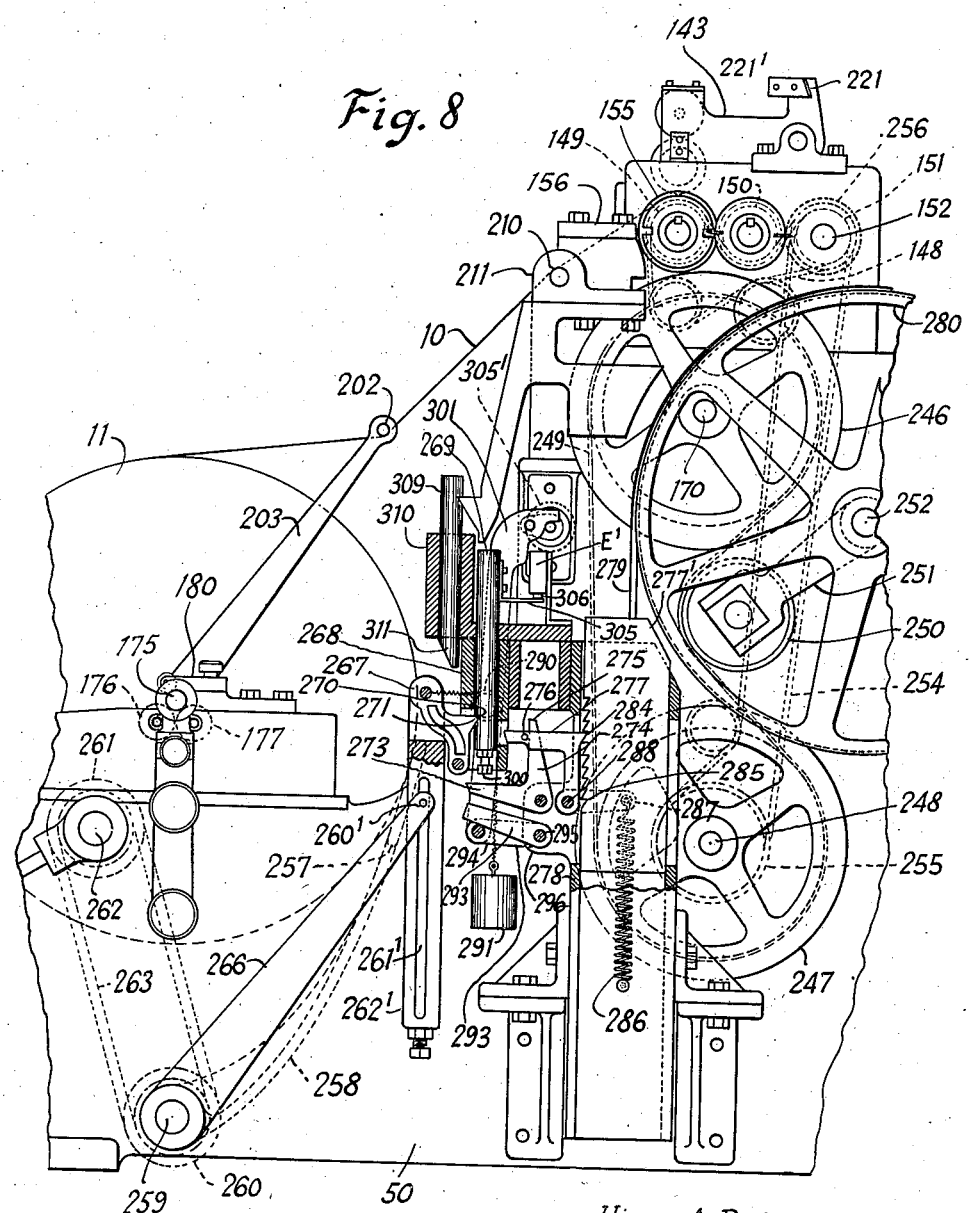

Patented Aug. 20, 1946

2,406,033

UNITED STATES PATENT OFFICE 2,406,033

APPARATUS FOR THE MANUFACTURE OF CONVOLUTED RODS

Hiram A. Perkins, deceased, late of Rochester, N. Y., by Stuart L. Perkins, Rochester, N. Y., and Madeleine P. Hathaway, Essex County, N. J., executors, assignors to Setter Bros. Inc., Cattaraugus, N. Y., a corporation of New York Original application August 31, 1940, Serial No. 354,945. Divided and this application January 19, 1944, Serial No. 518,827

8 Claims. (Cl. 93—1)

This application is a division of application Serial No. 354,945, filed August 31, 1940.

This invention relates to the manufacture of candy sticks. It also involves the use of sheet material strips which are convoluted and bonded into compact rolls forming rigid rod-like members of small diameter.

The invention involves such improvements over the apparatus shown in the co-pending application of U. S. Patent No. 2,308,537 (January 19, 1943), that the illustrative candy sticks can be effectively produced in much greater quantity per unit of time, thus correspondingly lowering the cost of production.

Other improvements of the present invention materially reduce the time required to place a new supply roll in operative position on the machine and to start the machine with the sheet material of a new roll and to maintain the operative relationship of the supply roll to the other machine components by axially and precisionally moving the supply roll during the operation of the machine.

The illustrative improvement over the apparatus disclosed in my prior co-pending application involves high speed operation in combination with means for maintaining the uncut rod ends within adequate range of the stick cutter knives without any interruption to the operation of the machine.

In compliance with the Federal patent statutes and particularly Sec. 4888 R. S., the invention will now be described with reference to certain specific embodiments, other objects and characteristics of the invention appearing from that description.

The description of the invention has reference to the accompanying drawings in which the reference characters indicate parts which are similarly referred to in the description.

In the drawings:

Figs. 2 and 2A are partial longitudinal vertical sections through a machine for manufacturing the illustrative candy sticks, the machine producing sticks of less than ¼ in. diameter at a rate at least as great as 900 sticks per minute.

Fig. 3 is a vertical section of the rod cutter.

Fig. 4 is a plan of the rod cutter.

Fig. 5 is an end elevation of a part of the rotatable supply roll mount.

Fig. 6 is a partial front elevation of the supply roll mount.

Fig. 7 is a plan of the supply roll mount.

Fig. 8 is a view in the nature of a vertical elevation showing parts of the operating and control mechanism.

Figure 1:
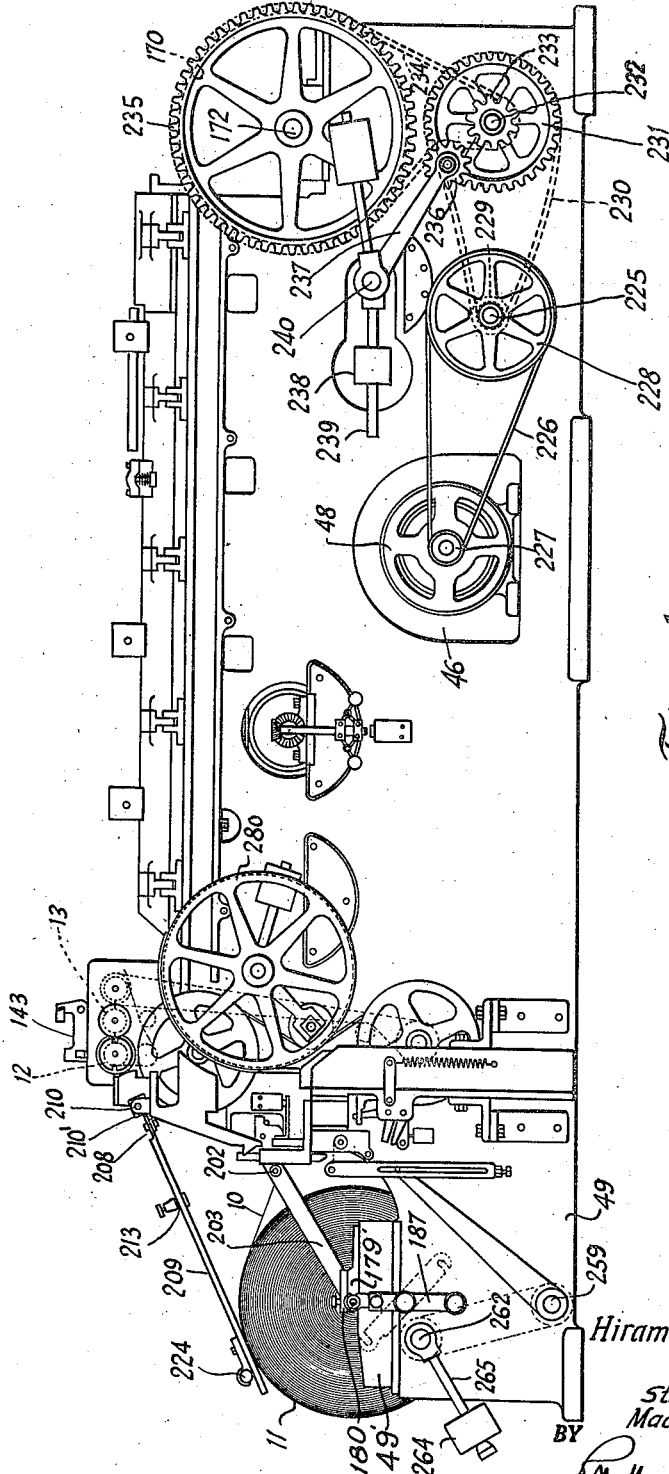
Fig. 1 is a side elevation of the illustrative machine.

In the operation of the illustrative machine supply rolls of a coated paper are employed. The paper is preferably white and its properties are such that it facilitates the bonding of the sticks at a rapid rate of production and promotes the manufacture of a superior confection support.

During the operation of the machine paper or other sheet material 10 (Fig. 1) is continuously unwound from a supply roll 11 and pulled into the machine by the action of the strip cutter rolls 12 and 13, and their associated rolls. The strip cutter roll 13 is provided at diametrically opposed positions on its periphery with projecting knives 14 and 15 (see Fig. 2) or saw teeth which cooperate with recesses 16 and 17 in the roller 12 to sever the paper into strips.

Each severed strip 18 passes downwardly from the strip cutter and is guided into contact with a fluted crimper roll 19 and a rubber covered roll 20 with which the crimper roll may be said to be inter-geared. The rubber covered roll 20 intergears with the crimper roll as a result of such relative positioning of the crimper roll 19 and the rubber covered roll 20 that the teeth 21 of the former depress the rubber covering of the roll 20 during the operation of the machine.

Each paper strip 18 descending from the cutter roll is thus gripped between the crimper roll and the rubber covered roll and is crimped or creased by the sharp edges or flutes of the crimper roll as the strip advances.

The crimper roll 19 is also provided along its length with a plurality of circumferential grooves, the base of each of which is lower than the grooves of the flutes of the crimper roll. These grooves receive the lower ends of correspondingly shaped teeth of a stripper plate 24 rigidly secured to a heavy convoluter plate 25 which determines the upper surface of a tapered passage in which the crimped strips are initially convoluted. The details of this structure are shown in the parent application 354,945 (now Patent 2,357,846, September 12, 1944).

The lower surface of the convoluting passageway 26, particularly indicated in Fig. 2 of the drawings, is determined by a fixed bedplate structure 27 over which is trained a main belt or carrier 28, normally moving in the direction of the arrows 29 of Fig. 2.

As the leading edge of a paper strip 18 proceeds around the crimper roll 19 it comes in contact with the teeth of the stripper plate which act to separate it from the crimper roll. This action continues until the stripped part of the sheet material forms a loop 30 projecting sufficiently away from the crimper roller to come into contact with the continuously moving carrier 28. Thereupon the remaining part of the crimped strip is separated from the crimper roller at an advanced position and the separated loop is then so increased in length and so moved away from the crimper roller that the conjoint effect of the crimping of the strip and the movement of the belt causes the strip to begin to convolute as indicated at 31 in Fig. 2.

As the crimped and convoluted strip is moved along by the carrier the number of its convolutions increases, and the overall transverse dimension of the loosely convoluted roll decreases as indicated at 32–38 inc. (Figs. 2 and 2A). The effect of this action, in combination with the taper of the convoluting passageway is such that the loosely convoluted roll assumes somewhat of an ovate shape as at 33. This is undesirable in the present product, and, the operation of the illustrative apparatus would be much less efficient, possibly to the extent of being economically inoperative if such action were allowed to continue. The effect of such action is counteracted at the end of the convoluting passageway 26 by providing a first compacting zone C in which the stick passageway is such that it permits the loosely convoluted rolls to change their ovate shape and assume a more nearly round contour immediately after they reach the exit of the convoluting passage, and as indicated by a comparison of stages 33 and 34.

The compacting passage 40 in the zone C is preferably tapered downwardly from its entrance at stage 34 so as to speed up the further convoluting and compacting of the loosely wound rolls. This speed-up however, again causes the compacted rolls to assume an ovate shape as they reach the end of the zone C and, consequently, there is provided a second compacting zone D at the entry of which the compacted rolls are permitted to change from the ovate shape to a more nearly round shape. Otherwise the second compacting zone is similar to the first compacting zone but it has such characteristics that the convoluted sticks are decreased in their outside diameter as compared to the sticks discharging from the first compacting zone.

A third compacting zone E bears the same relationship to the preceding compacting zone D as the latter does to the compacting zone C and beyond the zone E the compacted sticks pass through a longer zone F. In the latter the compacted sticks are subjected to pressure and a convoluting effect for such an increased length of time that the sticks become permanently set. Also, this action takes place simultaneously with a bonding action which will receive subsequent reference.

Beyond the zone F the sticks pass through a zone G in which they are straightened and squared up with their longitudinal axes at substantially 90 degrees to the direction of travel of the main belt. This positioning of the sticks facilitates clean and sharp severing of the master sticks into candy sticks of the desired length in the stick cutting zone H, and promotes the advantageous finishing or burnishing of the ends of the severed sticks.

The side frame members are formed with motor openings 46 and are provided with projections 49 and 50 at the infeed end of the machine so as to facilitate the removal of exhausted paper supply rolls and the installing of new rolls in a minimum period of time.

Supported on top of the side members 41 and 42 of the main frame is the bedplate construction over which the main belt slides, and inasmuch as the bedplate determines the lower surface of the compacting and setting passageway the bedplate must be permanently and accurately set so as to give the correct vertical dimensions of the passageway within very close tolerances.

Above the bedplate is mounted the presser plate construction 67, extending from the fixed convoluter plate 25 to the discharge end of the main belt. The main part of this construction is preferably a casting having a friction facing $67^1$. The width of this casting is about the same as the main belt, and the presser plate is pivotally mounted upon the bedplate construction in order that it may be readily swung upwardly to its inoperative position to permit inspection of the main belt, master stick cutter, or other components of the machine.

For inspection of the stick engaging surface of the presser plate the machine is so arranged and constructed (see the parent application) that the attendant may be able to move the presser plate to its inoperative position as quickly as possible to reduce "outage."

As clearly shown in the drawings, the presser plate casting forms a support for a master stick cutter construction indicated as an entirety by the numeral 102. This cutter includes a number of blades 103–106 so fixed with reference to the presser plate that their cutting edges are related to the top surface of the main belt in the manner indicated in Fig. 2A of the drawings. The blades are set at a slight incline so that they gradually cut through the convolutions of the convoluted sticks as the latter are rolled along by the movement of the belt, the rear ends of the cutting edges of the blades being positioned at a level spaced above the upper surface of the belt a distance equal to approximately one-half of the diameter of the master sticks. Thus the latter may be said to be given a rolling cut upon the master sticks.

The blades of the stick cutter must have different spacings for candy sticks of different lengths. Sometimes candy sticks 3½ inches long are made and at other times sticks 5 inches long may be made, and the illustrative machine is adapted to produce sticks of such different lengths. To this end the cutter blades are frictionally gripped by the main filler blocks 107–109 which correspond in width to the desired length of candy stick. Such filler blocks are clearly indicated in Figs. 3 and 4 of the drawings.

The cutter assembly includes end filler blocks 110 and 111 preferably of the same length as the main filler blocks and all of these blocks are drilled to provide aligning bores which receive the tie rods or through-bolts 112 and 113. This filler block and rod assembly is set up in a jig upon the cutter base 114 with the transverse aligning projections 115 of the filler blocks fitting into a correspondingly shaped recess in the lower face of the base. Then the transverse filler block 116 is secured to the base and the cutter blades are adjusted to their correct projection beyond the operative face of the blocks by adjusting rods 117 and 118 which are freely received by openings in the cutter base and through notches in the edges of the filler blocks. This assembly preferably takes place while the entire cutter organization is inverted, and after the blades are accurately set, the filler blocks are tightened against the blades by through-bolts 112 and 113. Then the cap screws 119 passing through free holes in the cutter base 114 are tightly screw threaded into the filler blocks with their heads in engagement with the upper surface of the base so as to render the entire cutter head or cutter assembly, a rigid unit.

After the cutter assembly is thus completed it is placed in its operative position with reference to the presser plate and held therein by means of the contact of the projections 120 and 121 at the end of the cutter base with ledges or shoulders 122 and 123 on the side portions 124 and 125 of the presser plate. These projections are releasably held against these shoulders by any suitable means.

To facilitate the manual removal of the cutter assembly from the presser plate the latter is provided along its upper portion with tapped openings adapted to receive the handles 126.

Considering the progress of the compacted rolls through the zones of operation as they are indicated in Fig. 2 of the drawings, and more particularly considering the cutting of the sticks, it has been found that, due to various factors, the sticks will sometimes become slightly bowed, or will attain positions wherein they are out of parallelism (or oblique to their general path of travel) as they proceed through the convoluting and compacting passageways. This action may result from any one of a number of factors, or from a combination of them. For example, the paper may have imperfections here and there so as to vary the resistance of the opposite ends of the sticks to their travel through the compacting passageway.

When the sticks get out of parallelism, or when they become excessively bowed in their travel through the machine they are apt to interfere with the progress of adjacent sticks so as to cause them to pile up and stop the operation of the machine. Furthermore, the stick cutter can operate much more successfully if the sticks are squared up as they roll over the cutter knives 103-106.

For straightening and aligning the sticks as they approach the stick cutter, mechanism which is shown in some details in Figs. 2A, 3 and 4, inclusive, is provided.

This stick straightening and aligning mechanism includes a frame 127 disposed forwardly of the stick cutter and above the presser plate structure. This frame has rigid therewith a plurality of stick contacting or cam lift members 128-131 which project downwardly through openings in the presser frame. In the present arrangement, four of such members are clearly indicated in Fig. 4. They are aligned transversely of the path of movement of the sticks through the machine, and the master sticks contact these members as indicated by the relationship of the master stick 132 to them as shown.

The lower ends of the cam lift members 128-131 project into the compacting passageway and their end surfaces are bevelled as indicated at 133 so that as a master stick approaches these surfaces as indicated it will have a camming action to cause the pivoted frame to rise.

The rear end of the frame carries a stop bar 134 projecting into the path of the sticks, and each stick contacts this bar so as to become straightened or brought into parallelism with the normal to the general path of the movement of the sticks through the machine, before the succeeding stick operates the cam lift members to lift the frame. This action, of course, raises the stop bar and permits the straightened and squared-up stick to proceed to the cutter knives.

It is essential, in the operation of the stick straightener and aligner that the stop bar and the cam lifts be instantly returned to their lower positions, after they have been lifted by the camming action of a master stick passing under the cam lifts, and this is attained by the action of a compression spring 135 on upright stem 136 which is secured to the presser plate. This spring abuts against an adjustable stop 137 on the upper end of the stem so that the rapidity of the return of the cam lifts and stop bar to their lower position can be controlled.

The action of the stick straightening and aligning mechanism may be further modified by a similarly adjustable compression spring 140 which acts upon an arm 141 rigid with the straightener frame and extending forwardly thereof as indicated in Fig. 2A. The coil spring of this mechanism is usually under compression so as to urge this arm downwardly toward the bedplate structure, and the force with which this is done can be adjusted in the usual manner.

It is to be appreciated that the master sticks, as they pass through the straightening and squaring-up zone "G" will more readily be straightened and aligned if they are relieved, to a substantial extent, from the compacting pressure, or the grip with which they are moved through the machine. At the same time, it is necessary that the master sticks be continuously and positively gripped so that their forward movement will not be subject to excessive variation. For example, if for any reason the progress of any certain master stick through the machine should be stopped, then the succeeding sticks would pile up against it and seriously interfere with the operation of the machine.

It is also to be appreciated that, in order to obtain the maximum of stick production upon a given machine, the spacing of the sticks in the convoluting and compacting passageway must be small. It is therefore preferable that the progress of the master sticks must be under positive control at all times. These optimum conditions are attained by relieving the major portions of the master sticks of compacting pressure as they pass from the cam lifts to the stop bars in the zone G. The mid portions of the master sticks are, however, held under advancing pressure by a central strip 142 which projects downwardly from the adjacent surfaces of the lower face of the presser plate facing $67^1$ between the cam lift members 128, et seq. and the stop bar 134. The width of the strip projection 142 is but a small fraction of the length of the master stick so that the ends of the latter are relatively free as they move through the straightening and aligning zone. During this movement, and if one of the master strips is oblique to the intended path of advance, its leading end will strike the stop bar under such conditions that the greater part of the stick can be readily deflected and squared up with the stop bar without any appreciable danger of damaging the external convolutions of the stick.

The width of the strip or projection 142 is such that the master sticks are gripped only in a narrow zone at their mid portions.

In the illustrative apparatus, the paper, or other sheet material, passes continuously into the machine from the supply roll, and the rotating elements which sever the material into stick strips and the mechanism for crimping the strips so as to initiate their convolution are mounted in a roll stand indicated in Fig. 1. By means hereinafter described the paper is pressed against the constantly rotating presser roll 12 which has been previously described as formed with the diametrically opposed recesses 16 and 17 to receive the saw-teeth or other cutting elements 14 and 15 projecting from the cooperating cutter roll 13. Both of these rolls are positively driven from the same immediate driving element to maintain proper operative registration of the cutter knives and the recesses of the presser roll.

The severed strips of paper are advanced to a position wherein they are, in succession, forced against the crimper roll 19 by the rubber faced roll 20. The latter is pressed against the crimper roll and it is positively driven so that its resilient surface will act to inter-gear these two elements, the paper being crimped over the teeth or flutes of the crimper roll.

The roll stand also provides support for an easily shiftable frame 143 carrying the weighting rollers 144 and 145, the lower one of which is provided with a resilient facing 146 normally pressing the paper against the recessed presser roll 12 so as to cause the paper to be operatively gripped. This causes the paper to be continuously and uniformly pulled from the supply roll at the infeed end of the machine.

The cutter roll 13 is preferably a steel cylinder journalled in anti-friction bearings in the roll stand sides, and its diametrically opposed knives 14 and 15 are preferably in the form of saw-toothed blades, the teeth of which have such action that they will readily cut through the paper with a minimum of resistance. Their cutting action is also enhanced by the fact that they are arranged to contact with the paper as it is stretched across one of the recesses 16 and 17 in the presser roll, the speed of operation of the crimped roll being so co-related with the strip cutting mechanism as to attain this condition.

The cutter roll 13 and the recessed presser roll 12 are preferably driven at the same speed, and in opposite directions.

Beyond the position in which the paper is cut into stick strips the paper passes through an upright passage 157 defined on its rearward side by a fixed guide member 158 secured to the roll stand sides, and having its front wall defined by a second guide member 159 which is also designed to fit rather closely into the space between the presser roll 12 and the rubber faced roll 20 which drives the crimper. In this passageway the leading edge of each master strip 18 is guided to the position at which the crimper roll and its rubber faced roll are inter-geared. As soon as these two elements grip the severed strip of paper they so cause the strip to advance that, before the next strip cutting operation takes place, the paper is under tension across a recess of the presser roll.

The crimper roll is in the nature of a steel shaft with its surface machined to present such longitudinal flutes or ribs as those indicated at 21. It is also machined with a plurality of longitudinally spaced circumferential grooves which receive strippers in the form of metallic teeth formed as downward projections of the stripper plate 24 which is fixed in upright position at the forward end of the convoluter presser plate 25. These strippers act to remove the crimped strips from the crimper roll in order that the convolutions of the strips may be initiated.

The resilient facing 160 of the crimper presser roll 20 is of sufficient depth to permit desired penetration thereof by the teeth of the crimper roll, and this penetration is capable of variation by mechanism described in the parent application.

When coated paper is used as the material from which the sticks are produced, it is essential that some wetting or bonding agent be applied in order that the sticks may become thoroughly bonded. In the present instance, water is utilized as such an agent. The water is applied to and, to some extent, absorbed by the main belt. One advantage of utilizing a belt of absorptive material is that the application of the bonding agent may be effected at the exterior convolutions of the rolls (or master sticks) and at the proper time, in the operation of the machine.

In the illustrative machine the time of effective application of the bonding agent is during the passage of the sticks through the compacting zone F (see Fig. 2A). Here, the increased pressure of the sticks against the belt causes the absorbed water to be pressed from the belt and thus applied to the exterior convolutions of the sticks.

As illustrated in Fig. 2 of the drawings the forward end of the main belt is trained around a roll or pulley 169. At the discharge end of the machine, the belt passes over a large diameter pulley which is fixed to a driven shaft 172 so as to act as the driving element for the belt.

At the forward, or infeed end of the machine, the paper supply roll 11 is mounted so as to facilitate the removal of its shaft 175 upon which is left the core of an exhausted paper supply roll and also to facilitate the substitution of a full supply roll. As illustrated, the supply roll shaft is supported by bearings upon the forward extensions 49 and 50 of the main frame members, and these bearings are formed by spaced rollers 176 and 177 which act to cradle the supply roll shaft (as indicated in Fig. 5). The latter is non-rotatably mounted in the core 178 of the supply roll. This shaft is held upon the spaced rollers by a co-operating roller 179 rotatingly mounted in the end of a sliding block 180. The latter may be releasably secured by a clamp screw 180' to a bearing support 179' resting upon the forward extensions 49' of the main frame members. This arrangement of elements (see Figs. 5, 6 and 7) is such as to enable the operator to quickly place a new supply roll in operative position.

For minimizing production costs, a maximum percentage of the paper or other sheet material should be utilized in the ultimate product and, to this end, the width of the paper in the supply roll should be little more than a multiple of the lengths of the sticks produced. This means that the movement of the paper strip into the machine must be closely controlled at its edges, and this is made difficult because of variations in the winding of the paper upon the supply rolls. For example, some rolls may be appreciably "dished" or concave on one side, and when this is the case it is important that there be some means for correcting this condition and aligning the feed roll strip with the roll stand elements and with the remaining operative components of the machine. Such means are indicated in Figs. 5, 6 and 7 of the drawings. It includes two spaced annular members 181 and 182 which are fixed upon the outer end of the supply roll shaft 175. These members may constitute parts of a sleeve which is fixed upon the shaft and arranged to form a circumferential groove between them. In operation, the spaced parts 183 and 184 of an adjusting head 185 are closely received between the spaced annular members 181 and 182 as indicated in Figs. 5, 6 and 7. This head includes a block 186 slidably mounted upon the upper end of an arm 187 pivoted at an intermediate position to the main frame by the pin 188 and having its lower end formed with a slot 189 to receive the stem 190 of a clamp screw 191 by which the arm 187 is securely anchored in its operative position. This arm is shown in its inoperative position in Fig. 5 and it may be held in this position by the tightening of the intermediate clamp screw 192.

When the pivoted arm is in the position shown in Fig. 5, it permits the installation of a new supply roll, and after the shaft of the latter is in position the intermediate clamp screw 192 is released, and the arm 187 swung clockwise from the position in which it is shown in Fig. 5. Then the clamp screws 191 and 192 are tightened so as to hold the arm in its upright or operative position.

The slidable head 186 of the pivoted arm structure is movable relative to the remainder of the structure by means of an adjusting screw 193 which is freely rotatable in a depending part 194 of the head and is screw threaded into the upper end of the main part of the arm structure as indicated in Fig. 6.

The extent of movement of the head 186 laterally of the main part of the pivoted arm 187 is small but it is sufficient to compensate for imperfections in the winding of the paper upon the supply roll. The extent of movement of the head with reference to the arm is indicated by the length of the slots 195 and 196 in this head. These slots (see Fig. 7) receive the stems of the pins or cap screws 197 and 198 which are preferably threaded into the main part of the pivoted part of the main arm structure. Any twisting or turning of the head with reference to the base may be prevented by a longitudinal groove and rib construction, which is indicated in Fig. 6 at 199 and 200.

In the operation of the machine the attendant carefully notes the condition of the sides of the supply roll and, when he sees that the paper is about to unwind at a position at which it is imperfectly wound he will turn the adjusting screw to compensate for this imperfection and thus eliminate difficulties which would otherwise impair the operation of the machine.

It will be noted that the operation of the adjusting screw 193 affords a precision adjustment of the slidable head with respect to the remainder of the supply roll aligner. Also the threads 201 of the adjusting screw are such that fine adjustment is afforded.

The strip material on the supply roll is unwound by the pull exerted upon the paper by the rollers associated with and constituting a part of the strip cutting mechanism. The paper first passes in a straight run around a tensioning roller 202 supported at the rearward or upward end of a pivoted frame. The side members 203 of this frame are mounted so as to pivot around the axis of the supply roll and the frame is spring biased downwardly. Thus the paper strip unwinding from the supply roll is maintained under tension without involving any unnecessary whip of the tensioning mechanism as the resistance to the advance of the paper varies.

Beyond the tensioning roller 202 the paper passes through an opening 208 at the front end of the supply roll brake 209, and between that brake and a guide rod or roller 210 mounted upon standards 211 fixed to the main frame at a position forwardly of the roll stand.

After a supply roll is mounted in operative position as above indicated, the brake mechanism is placed in position with its forward end pivotally mounted upon the rod or roller 210 and with its under surface in contact with the periphery of the paper supply roll. The paper is then pulled from the supply roll, passed underneath the tensioning roller 202 and then upwardly through the opening 208 at the front of the supply roll brake. It is then folded back so that its leading end is passed underneath a straight-edge 213 which is mounted near the forward end of the supply roll brake. This straight-edge extends across the brake member 209 and is normally biased upwardly to a position spaced from the upper surface of the brake member by coil springs shown in detail in the parent application. Normally, however, this straight-edge is so spaced from the upper surface of the brake member that the leading end of the paper may be easily passed through the opening between the lower surface of the straight-edge and the upper part of the brake member. This straight-edge is then manually pressed downwardly tightly against the paper and its irregular leading edge is torn off so as to form a straight leading edge. This edge is then threaded over the rod 210 and then around the presser roll 12. Preferably its leading edge is moved around the presser roll until it contacts with one of the cutter knives, and the roll 12 is turned just enough to cause the leading edge of the paper to be gripped.

The brake member 209 preferably consists of a flat base which is provided with a weight 224 at a position above its contact with the supply roll. This weight plus the weight of the entire brake structure being such as to prevent overrunning of the supply roll and to cooperate with the tensioning roller 202 to maintain the paper tension within the desired limits. This frame is also freely pivotable about the guide rod 210 and for that purpose it is provided at its forward end with side yokes $210^1$ which fit closely about the upper surface of the guide rod and permit the entire brake mechanism to be easily lifted from its operative position so as to enable the operator to quickly dispose a new supply roll in its operative position.

The parts of the illustrative machine are so arranged that the drive is initially, to the discharge end of the main conveyor belt, or carrier 28. This has the advantage that the belt is put under tension throughout the operative zones of the machine. An additional advantage is that the conveyor belt thus acts as a driving means for the cutting, crimping and feeding mechanism. By this arrangement the operation of the strip cutting mechanism may be independently stopped under certain conditions, and, thereafter, the conveyor belt will tend to continue its movement until the operative zones are freed of the advancing sticks. This is important because the sticks, if permitted to remain stationary in the operative zones above the belt will have a tendency to pick up an excessive amount of moisture from the belt and be thereby ruined.

The motor 48 drives a first counter-shaft 225 by means of a series of endless belts 226 trained around a pulley 227 of small diameter on the motor shaft and a pulley 228 of considerably larger diameter upon the counter-shaft 225.

The drive from the first counter-shaft takes place through a driving sprocket pinion 229 fixed to the first counter-shaft and operatively engaged by a sprocket chain 230 which passes around a sprocket wheel 231 of considerably larger diameter disposed upon a second counter-shaft 232 rotatably mounted in the frame of the machine beneath the discharge end of the main supply belt. From the second counter-shaft power is transmitted to the shaft 172 by a sprocket pinion 233 fixed upon that counter-shaft. Around this pinion is trained a sprocket chain 234 which passes around a sprocket wheel 235 of considerably larger diameter fixed upon the shaft 172. This sprocket chain is maintained in appropriate driving condition by an idler sprocket 236 rotatably mounted upon the end of a crankarm 237 which is biased upwardly by a counter-weight 238 adjustably mounted rearwardly on a rod 239 upon which the counter-weight is slidable. For maintaining the idler sprocket against the main drive chain the crankarm and the counterweight arm are mounted so that they move as a unit. Preferably this unitary construction pivots freely around a counter-weight rod 240.

The drive by means of a conveyor belt to the crimper and strip cutting mechanism at the forward end of the machine takes place through a shaft 169 upon which the roll or pulley 170 is fixed, the details of this driving mechanism being described in the parent application.

It has been found that the condition of the paper near the center of many supply rolls is such that it will not properly pass through the machine and form the illustrative sticks in the desired manner and for this reason it is important that the infeed of paper into the machine be interrupted while several feet of the paper still remain upon the supply roll. Otherwise the folded up or deformed paper near the end of the strip on the supply roll will cause the machine to become clogged with imperfectly formed sticks, and much valuable time will be lost while the machine is being cleared. Therefore, the illustrative machine includes mechanism by which the infeed of paper is stopped automatically at a time in the operation of the machine when there is but a few feet of paper left upon the supply roll.

The mechanism for accomplishing the above indicated result includes a presser head 257 normally in contact with the periphery of the supply roll. This head is preferably integral with an arm 258 fixed upon a rod 259 mounted in bearings in the frame of the machine at a position beneath the supply roll. Toward one end of the rod, and at a position laterally of the supply roll, this rod is provided with a sprocket pinion 260 fixed thereto. A sprocket chain 263 is trained around this pinion and a similar pinion 261 fixed upon an upper stub shaft 262. The latter is biased in one direction by a counter-weight 264 adjustably and releasably mounted on a rod 265 fixed to the stub shaft. By this arrangement of elements the presser head is held lightly against the surface of the supply roll and the rod 259 is permitted to gradually turn in a counter-clockwise direction as the supply roll diminishes in diameter. As this action takes place the crankarm 266, fixed upon the rod 259 at the side of the machine remote from the operator's station, moves correspondingly so that a pin 260¹ secured in its upper end rides in a slot 261¹ formed in a control link 262¹ which is movable from the vertical position in which it is indicated in Fig. 8 of the drawings to a horizontally inclined position. This link 262¹ is shown in Fig. 8 in the position in which it is disposed when the presser foot is engaging the periphery of a new supply roll.

As the crankarm 266 moves from its Fig. 8 position to its feed stopping position it exerts a pull upon the control link 262¹ and consequently causes a counter-clockwise movement of a detent link 267 to which the control link is pivotally connected. This detent link is pivotally mounted at the lower end of a sleeve 268 which forms a guide for a vertically movable main control rod 269, the latter being provided near its lower end with a recess 270 in which the detent 271 of the link is received when the parts are in the positions indicated in Fig. 8.

Under conditions of normal operation the detent link 267 is held at the extreme limit of its clockwise movement as indicated in Fig. 8. The detent 271 is held within the recess 270 of the control rod and the latter is thus prevented from falling to its feed interrupting position.

When the paper supply roll is so depleted that it causes the detent link 267 to disengage the control rod, the latter drops and falls upon a part 273 of a bellcrank 274 and causes the other arm 275 of the latter to act against a pin 276 carried by an arm 277 of the detent for the main control weight 277¹. The latter is guided vertically by a housing 278 and its upper end is connected by a cable 279 to the rim of a large diameter grooved wheel 280 fixed upon the handwheel shaft or control rod 252. By reason of this arrangement of elements the relation of the detent for the main weight, or the movement of this detent from its Fig. 8 position permits the main weight to drop as indicated, and, consequently, to so turn the control rod 252 for the belt tightener pulley that the drive from the third counter-shaft to the paper feeding mechanism is interrupted. The main weight is such that it overbalances the effect of a counter-weight associated therewith as shown in the parent application. Under normal operation this counterweight holds the belt tightener pulley in such position that power is continuously transmitted to the roll stand.

The detent 284 for holding the main control counter-weight in its elevated position is held in engagement with ratchet teeth 285 upon the forward edge of the counter-weight by the action of a coil spring 286 secured to a crankarm 287. This element is fixed to the pintle 288 upon which the detent member 284 is fixed and the detent for the vertically sliding control rod is preferably continuously biased toward its engagement with the control rod by a small diameter coil spring 289 which passes over a sheave 290 and has a freely hanging counter-weight 291 secured to its lower end as clearly indicated.

Thus, when the sliding control rod is moved to its elevated position the main control counter-weight becomes locked in its elevated position as soon as it is raised thereto, and the control rod is also automatically locked in its elevated position. For raising the control rod to the limit of its vertical path of movement, mechanism is provided and arranged so that it may be operated from a position convenient to the operator's station. This mechanism includes crankarms 293 and 294 fixed to a lower pintle 295 mounted on a support 296 fixed to and extending forwardly of a housing which guides the main control counterweight in its vertical movements. This is clearly shown in Fig. 8.

The crankarm 293 which is disposed directly beneath a similarly projecting arm 273 of the bellcrank 274 is adapted to contact with the lower end of the control rod 269, or adjusting mechanism 300 which moves as a unit with that rod. Thus, when this pintle 295 is turned in a clockwise direction the control rod will be raised to its elevated position in order that the control parts may be so locked that the machine will continue in normal operation.

The crankarm 293 is turned clock-wise by the lifting of an upright link 301 which is pivoted at its lower end to the other crankarm 294 extending from the lower pintle and pivoted at its upper end to a crankarm 303 which is fixed to a manually operated control rod 304 transversely and rotatably mounted in the machine. This control rod extends across the machine toward the operator's station where it is provided with a handwheel 305¹ by which it may be turned so as to raise the control rod and permit the machine to resume its normal operation while maintaining the control parts in such condition that the infeed of paper to the roll stand mechanism will be automatically stopped when a predetermined amount of paper remains upon the supply roll.

In the event that the paper fails to travel properly through the strip cutting mechanism and to the crimper, and winds up upon the cutter roll 13 the detent 267 for the main control rod will be withdrawn, or forced slightly in a clockwise direction to the position in which it is indicated. This action will permit the main control rod to fall so as to strike the lower arm 273 of the bellcrank 274 which acts upon the detent 284 for the main control weight 277¹ to release the latter, allow it to fall, and thus stop the operation of the crimper, cutter, and paper feeding mechanism.

After the undesired condition of the paper around the recessed presser roll is corrected, normal operation of the machine may be resumed only after the auxiliary control rod 309 is moved to its elevated position, and held in that position by the engagement of the detent on the control lever 307. Subsequently, of course, the control hand wheel 305 must be operated to raise the main control rod 269 to its elevated position. The very fact that this plurality of manual operations is necessary before the normal operation of the machine can be resumed tends to eliminate any premature resumption of such operation.

Although the invention has been described with reference to certain specific and preferred embodiments, it is to be appreciated that the invention is not limited to all of the details thereof, but that it is, rather, of a scope commensurate with the scope of the subjoined claims.

What is claimed is:

1. In a candy stick machine, means for convoluting paper sections to form loosely convoluted rolls, means including a rotatable paper supply roll for supplying and feeding said sections to the convoluting means, a mounting for the supply roll, means forming a passageway in which the rolls are further convoluted and compacted to form rods, a part of said last named means including a carrier, a cutter head forming with the carrier a substantial continuation of the passageway, knives carried by the cutter head and extending into the passageway so that the ends of the rods are cut off smoothly by rolling against and along the knives, and means active upon the supply roll and its rotatable mounting for axially displacing the supply roll to maintain a substantial end portion of each uncut rod on the outer side of each knife, said last named means being operative while the machine and all of said means are in normal operation.

2. A machine for producing candy sticks comprising, in combination, means convoluting sheet material to form loosely convoluted rolls, means including a rotatably mounted supply roll for supplying sheet material to said convoluting means, means compacting said rolls by further convoluting action at increased pressure to form substantially solid rods, a plurality of relatively fixed cutting elements extending into the path of said rods and operative to smoothly cut-off the ends of said rods, means rolling said rods over said cutting elements while the increased pressure and convoluting action of said compacting are maintained, a cutter head including said elements and presenting a surface against which the rods are rolled while they are cut, and means for axially moving said supply roll to maintain uncut rod ends extending outside of the zones of action of said cutter elements.

3. In a candy stick machine, a convoluter acting upon paper strips to form them into convoluted rolls, means including a rotatable supply roll mount for supplying paper strips to the convoluter, a compacter further convoluting the rolls to form them into substantially solid rods of smaller diameter, the compacter presenting opposite roll contacting and passageway forming surface devices at least one of which is normally in motion, a rod cutter head normally spaced from said moving surface device to form therewith a continuation of said passageway, the head having spaced cutters projecting into the passageway continuation for transversely cutting the rods near their ends, means maintaining said surface units in fixed passageway forming relationship, means normally holding the cutter head pressed against rods rolling along the moving device, and means effective to precisionally change the position of the supply roll axially thereof without interruption of the normal operation of the machine or any of said means, said supply roll position changer being operative to maintain the opposite end portions of each uncut rod outside the lines of action of said spaced cutters.

4. In a machine for forming small diameter convoluted rods from strip material, roll mount means rotatably maintaining a supply roll of the strip material in operative position, strip convoluting and rod forming means including a carrier, a rod cutter associated with the rod delivery zone of the carrier and acting to transversely cut through the convolutions of the rod near the rod ends as the rods are advanced by the carrier, strip feeding and cutting means unrolling the strip material from the supply and cutting rod forming strips from the unrolled material, and means associated with the roll mount operative to make precision changes in the relation of the supply roll and the rod cutter axially of the supply roll without interrupting the operation of any of said means or the rod cutter, the last named means including a part fixed relative to the supply roll.

5. In a rod forming machine, strip convoluting and roll compacting means including a carrier from which a continuing stream of parallel and closely spaced small diameter convoluted rods is delivered, strip feeding and cutting means including a rotatably mounted supply roll and delivering severed rod strips of flat material to said first means, cutters set in fixed positions transversely of the path of movement of the ends of the rods of said stream and acting to smoothly cut-off the ends of the rods, and means maintaining the strip and said stream of rods in a path of movement including said fixed positions of the rod cutters, said last named means including a supply roll shifter operative to move said roll axially.

6. In a machine forming small diameter rods of convoluted sheet or strip material, bearing means rotatably and slidably mounting a shaft for a supply roll of said sheet or strip material, strip cutting and feeding means severing the strip material into rod strips, a convoluter receiving the rod strips and forming them into convoluted rolls of a length equal to the width of the sheet material on the supply roll, a roll compacter further convoluting said rolls into substantially solid small diameter rods, the convoluter and compacter causing the severed sheet material to be fed the machine while into the rolls and rods advance through the convoluter and compacter in closely spaced and parallel positions, a rod cutter having a rod cutting element near each side of the path of movement of the rods and operating to smoothly cut-off the ends of the rods as they advance through the machine, and a supply roll mover associated with said bearing means and effective to maintain the rods with the ends of each rod beyond the lines of action of said cutting elements.

7. In a machine for forming small diameter convoluted rods from strip material; roll mount means rotatably maintaining a supply roll of the strip material in operative position to supply the strip material to the machine; strip convoluting and rod forming means including a carrier; a rod cutter associated with the rod delivery zone of the carrier and including knives acting to transversely cut through the convolutions of the rod near the rod ends as the rods are advanced by the carrier; strip feeding and cutting means unrolling the supply roll and cutting rod forming strips from the unrolled material; and means associated with the roll mount operative to make precision changes in the relation of the supply and the rod cutter axially of the supply roll without interrupting the operation of any of said means or the rod cutter; the last named means and the roll mount including a shaft upon which the supply roll is non-rotatably mounted, rotating lower bearing elements normally cradling opposite end portions of the shaft and rotatably supporting the roll, upper rotating bearing elements for engaging the shaft and preventing its disengagement from the lower bearing elements, means for shiftably mounting the upper bearing elements independently of the mounting for the lower bearing elements, a normally fixed device engaging a portion fixed relative to the shaft to determine the endwise or axial position of the latter, and means included in said device for effecting axial movement of the shaft through its bearings and hence axial movement of the supply roll to maintain rod portions on each side of the lines of action of said knives.

8. In a machine for forming rods by rolling up sheet material; a support for said material a convoluter forming loosely convoluted rolls from sections of said material; a roll compacter forming smaller diameter rods from said rolls as the rolls and rods advance in closely spaced parallelism through the machine; a rod cutter including cutting elements in fixed positions normally in the path of movement of the end portions of the rods so as to smoothly transversely cut off the end portions of the rods; and means disposed in advance of the convoluter and acting upon said support for controlling the axial positions of the rods with respect to the cutters to maintain uncut rod end portions of sufficient length outside the lines of action of said cutting elements.

STUART L. PERKINS,
*Executor of the Estate of Hiram A. Perkins, Deceased.*

MADELEINE P. HATHAWAY,
*Executrix of the Estate of Hiram A. Perkins, Deceased.*